United States Patent [19]
Solomon et al.

[11] Patent Number: 5,516,351
[45] Date of Patent: May 14, 1996

[54] FOAMED GLASS MANUFACTURE

[75] Inventors: David Solomon, Växjö, Sweden;
Michael Rossetti, Woburn, Mass.

[73] Assignee: Recycled Glass Products, Inc.,
Jamaica Plain, Mass.

[21] Appl. No.: 286,661

[22] Filed: Aug. 5, 1994

[51] Int. Cl.$^6$ .................................................. C03B 19/06
[52] U.S. Cl. .............................. 65/17.4; 65/17.3; 65/22;
264/65; 264/66; 264/41; 264/42; 264/43;
264/44
[58] Field of Search ......................... 65/17.3, 17.4,
65/22; 264/65, 66, 41, 42, 43, 44

[56] References Cited

U.S. PATENT DOCUMENTS

| | | | |
|---|---|---|---|
| 3,151,966 | 5/1958 | Slayter | 65/22 |
| 3,207,588 | 9/1965 | Slayter | 65/21 |
| 3,325,341 | 6/1967 | Shannon | 161/168 |
| 3,532,480 | 9/1965 | D'Eustachio | 65/20 |
| 3,574,583 | 4/1971 | Goldsmith | 65/22 |
| 3,628,937 | 12/1971 | Schott | 65/22 |
| 3,811,851 | 5/1974 | MacKenzie | 65/22 |
| 3,870,496 | 3/1975 | Cutler | 65/22 |
| 3,900,303 | 8/1975 | Mackenzie | 65/18 |
| 3,945,816 | 3/1976 | Johnson | 65/22 |
| 3,975,174 | 8/1976 | Camerlinck | 65/22 |
| 3,981,950 | 9/1976 | Pletzer et al. | 264/109 |
| 4,059,425 | 11/1977 | Brydges et al. | 65/22 |
| 4,081,259 | 3/1978 | Bassin et al. | 65/21 |
| 4,124,365 | 11/1978 | Williams et al. | 65/22 |
| 4,143,202 | 3/1979 | Tseng et al. | 428/406 |
| 4,218,260 | 8/1980 | Metzler | 106/98 |
| 4,314,835 | 2/1982 | Pelton | 65/22 |
| 4,411,679 | 10/1983 | Pelton | 65/22 |
| 4,430,108 | 2/1984 | Hojaji et al. | 65/22 |
| 4,673,697 | 6/1987 | Rowley | 523/218 |
| 4,687,694 | 8/1987 | Kuper et al. | 428/156 |
| 4,801,563 | 1/1989 | White | 501/85 |
| 4,826,788 | 5/1989 | Dennert et al. | 501/39 |
| 4,981,521 | 1/1991 | Bettacchi et al. | 106/81 |

OTHER PUBLICATIONS

*R.I. Makes Modifications To Minimize Mixed Glass*, by Susan Combs, article in *Recycling Times* dated Mar. 1992.
*Developing non-traditional glass markets*, by Jeanne Trombly, article in *Resource Recycling* dated Oct. 1991.
*Fiberglass manufacturers revisit cullet*, by Steven Aptheker, article in *Resource Recycling* dated Jun. 1990.

*Primary Examiner*—David L. Lacey
*Assistant Examiner*—Sean Vincent
*Attorney, Agent, or Firm*—Haynes and Boone

[57] ABSTRACT

A foamed glass product and its manufacturer are disclosed. According to the present invention, crushed glass particles and a foaming agent, preferably selected from $CaCO_3$ and $CaSO_4$, are provided. The glass particles and foaming agent are mixed and heated to a desired foaming temperature for creating foamed glass. A nonreactive gas having desired insulative properties, preferably selected from $SO_2$ and $CO_2$ is provided to sweep air away from the mixture during heating.

14 Claims, 4 Drawing Sheets

[CELL GAS = 100% SO2]

[CELL GAS = 100% CO2]

FOAMED GLASS MANUFACTURE

TECHNICAL FIELD

The present invention relates to glass and more particularly to foamed glass and its manufacture. The present application also relates to the use of recycled glass in the manufacture of foamed glass.

BACKGROUND OF THE INVENTION

A number of foamed glass products are generally known in the art. Foamed glass panels have been formed by blowing air or another gas into molten glass and allowing the molten glass to cool and entrap the bubbles or cells in the solidified glass. Alternatively, foamed glass has been formed by mixing a gas-generating agent, or foaming agent, with finely crushed glass particles. The mixture is then heated to a temperature at which the glass is sinterend, softened or molten and the foaming agent releases gases. The mixture is then cooled to entrap the bubbles or cells formed by the gases.

Foamed glass has a number of desirable characteristics that make it useful as an insulation product. For example, foamed glass insulation products are generally moisture resistant, fire resistant, corrosion resistant, and vermin resistant. However, foamed glass insulation products are not without problems. For example, lack of relative uniformity as to size, cell wall thickness, and cell distribution have had a negative impact on the quality and characteristics of foamed glass products. Also, foamed glass products have been expensive, and use of foamed glass has not been widespread due in part to its relatively modest insulative properties. Advertising for a common foamed glass product cites an R-value of 3.3 hr·ft$^2$·°F./Btu·in, which compares poorly with polyisocyanurate foam core insulating materials which, according to advertising materials, provide R-values of over 5.6 hr·ft$^2$·°F./Btu·in. Foamed glass insulation may nonetheless be preferable to polyisocyanurate panels because polyisocyanurate panels incorporate freon gas, a chloro-fluorocarbon (CFC) that can leak from the foam. Rigid foam polyurethane is also popular in building energy efficient housing but suffers from a similar problem in that CFCs and. hydrochloro-fluorocarbons (HCFCs) are released during production.

With respect to starting materials, commercially manufactured foamed glass typically uses virgin glass as starting materials. This is unfortunate in light of the desirability of finding new uses for scrap glass containers and mixed color cullett. Various glass recyclers are able to recycle much of the scrap glass containers collected in the U.S. However, glass breakage during collection creates a mixed color cullet fraction estimated at approximately 10% to 20% of the glass containers collected, and it is more difficult to find suitable uses for this mixed color cullet fraction.

SUMMARY OF THE INVENTION

It is therefore an object of the present invention to provide a foamed glass product and method of manufacturing same which provides improved insulative characteristics.

It is a further object of the present invention to provide a foamed glass product and method of manufacturing same that is relatively simple and cost-effective to produce commercially.

It is a still further object of the present invention to provide a foamed glass product and method of manufacturing same which provides an R-value of greater than 3.3.

It is a still further object of the present invention to provide a foamed glass product and method of manufacturing same which may utilize recycled mixed color cullet glass.

Toward the fulfillment of these and other objects, the product and process of the present invention comprises providing crushed glass particles and a foaming agent, preferably selected from $CaCO_3$ or $CaSO_4$. The glass particles and foaming agent are mixed and heated to a desired foaming temperature for creating foamed glass. A nonreactive gas having desired insulative qualities, preferably selected from $SO_2$ and $CO_2$, (or $SO_x$ and $CO_x$) is provided to sweep air away from the mixture during heating.

BRIEF DESCRIPTION OF THE DRAWINGS

The above brief description as well as further objects, features, and advantages of the present invention will be more fully appreciated by reference to the following detailed description of the presently preferred but nonetheless illustrative embodiment of the present invention when taken in conjunction with the accompanying drawings wherein.

DESCRIPTION OF THE PREFERRED EMBODIMENT

The present invention involves the manufacture of a foamed glass product. Referring in general to the flow diagram of FIG. 1, waste glass is pretreated, and the pretreated waste glass and foaming agent are sized and mixed. The mixed glass and foaming agent are placed in molds and passed through a furnace where the mixture is heated to and maintained at a foaming temperature and then cooled or annealed to produce foamed glass blocks. A nonreactive gas having desired insulative properties is introduced during heating to sweep air away from the mixture. The foamed glass blocks are then removed from the molds and cut and ground to a selected size and finish.

Figure 1:
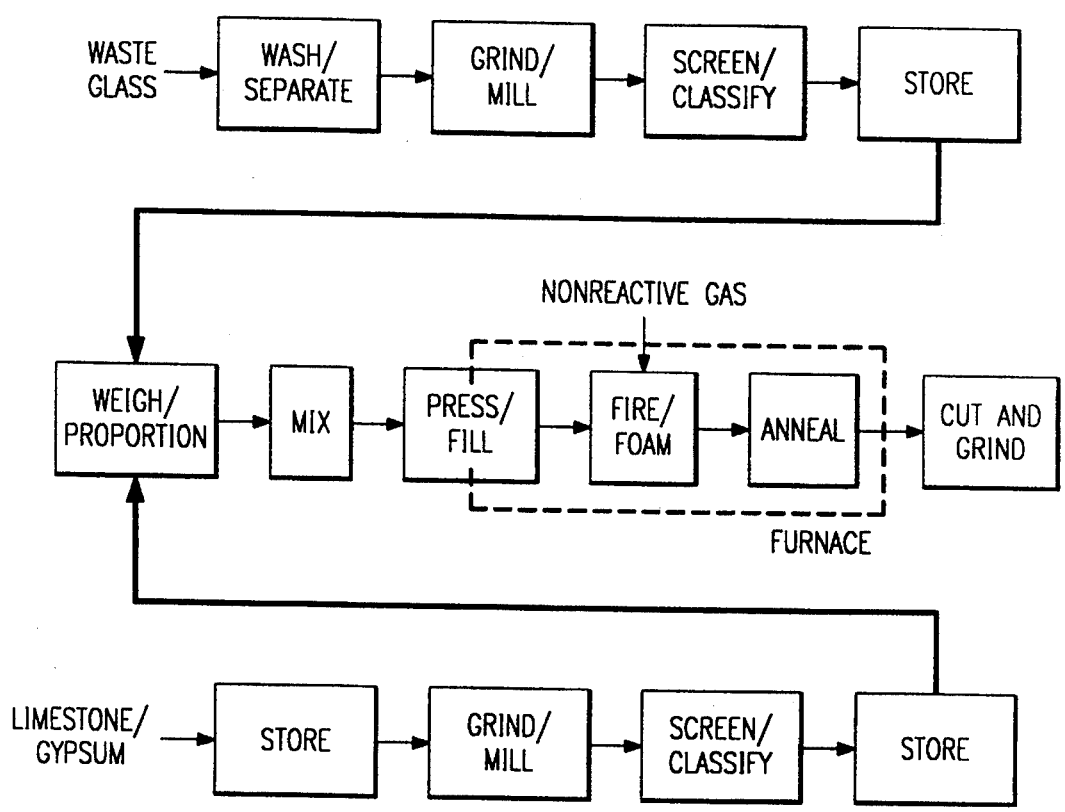
FIG. 1 is a flow diagram of a process of the present invention involving the processing of waste glass to obtain a foamed glass product of the present invention.

Referring to the flow diagram of FIG. 1, waste glass, such as mixed color cullet glass, is obtained from a suitable source such as a materials recovery facility for recycling. Of course, the glass used may be virgin material or from any other suitable source, in which case the following separation steps may be omitted or greatly reduced. The waste glass will likely contain some contaminants such as metal, paper, and other materials and will therefore likely require separation or pretreatment before being used to produce a foamed glass product. The waste glass is washed and passed through a magnetic separation step before being passed to a hammer mill or similar type crusher where the separated glass is crushed to a desired particle size. Any number of known separation steps may be utilized to obtain the desired degree of separation before the separated glass is passed to the crushing operation.

The size of the starting glass particles impacts the R-value of the resulting foamed glass product, so the glass particles are crushed and screened or classified to obtain a desired size. In the grinding, milling operation, a hammer mill or similar type crusher may be used, and the milling operation may be either wet or dry. In the screening/classifying operation, the fines or undersized materials are removed and may be sent to a waste disposal site or may be used to make a foamed glass product with a less desirable R-value. The coarse, oversized material is returned to the milling operation.

It is understood that individual starting glass particle sizes, foaming agent particle sizes, cell wall thicknesses, and cell diameters will vary somewhat. Accordingly, references herein to starting glass particle sizes, starting foaming agent particle sizes, cell wall thicknesses, and cell wall diameters relate to average values thereof. Also, the diagrams presented in FIGS. 2–8 represent calculated, theoretical values and do not represent actual experimental data. Default values for the various parameters, and the values of the various constants used to prepare FIGS. 2–8 are as follows:

foam density=90 kg/m$^3$ glass density=2460 kg/m$^3$ cell gas=25% $N^2$, 75% $CO_2$ or $SO_2$ cell wall thickness=10 microns cell diameter=1500 microns foaming temperature=1173 K furnace pressure=1.1 atm conductivity of $N^2$=0.0259 W/m.K conductivity of $CO_2$=0.01657 W/m.K conductivity of $SO_2$=0.1196 W/m.K conductivity of glass=0.72225 Btu/ft-hr-°F.

Stefan - Boltzmann Constant=0.17×10$^{-9}$ Btu/hr-ft$^2$-°R$^4$ room temperature=525 ° R.

Figure 2:
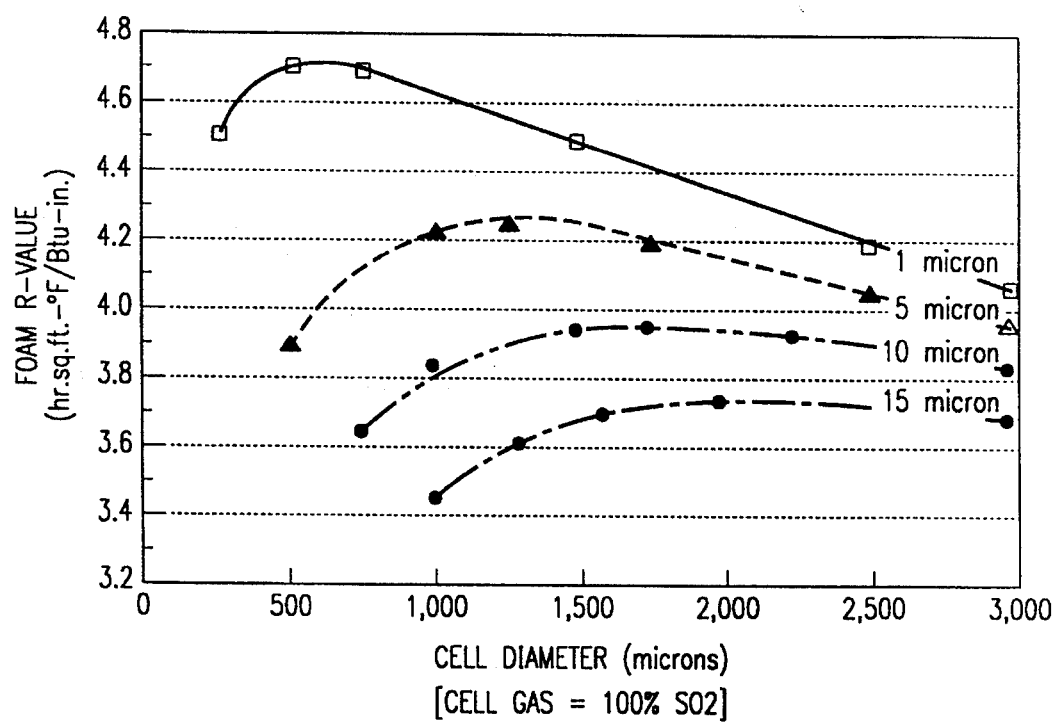
FIG. 2 is a diagram of theoretical R-values for selected cell sizes and cell wall thicknesses for a foamed glass product in which 100% of the gas pressure in the cells is provided by $SO_2$.
Figure 3:
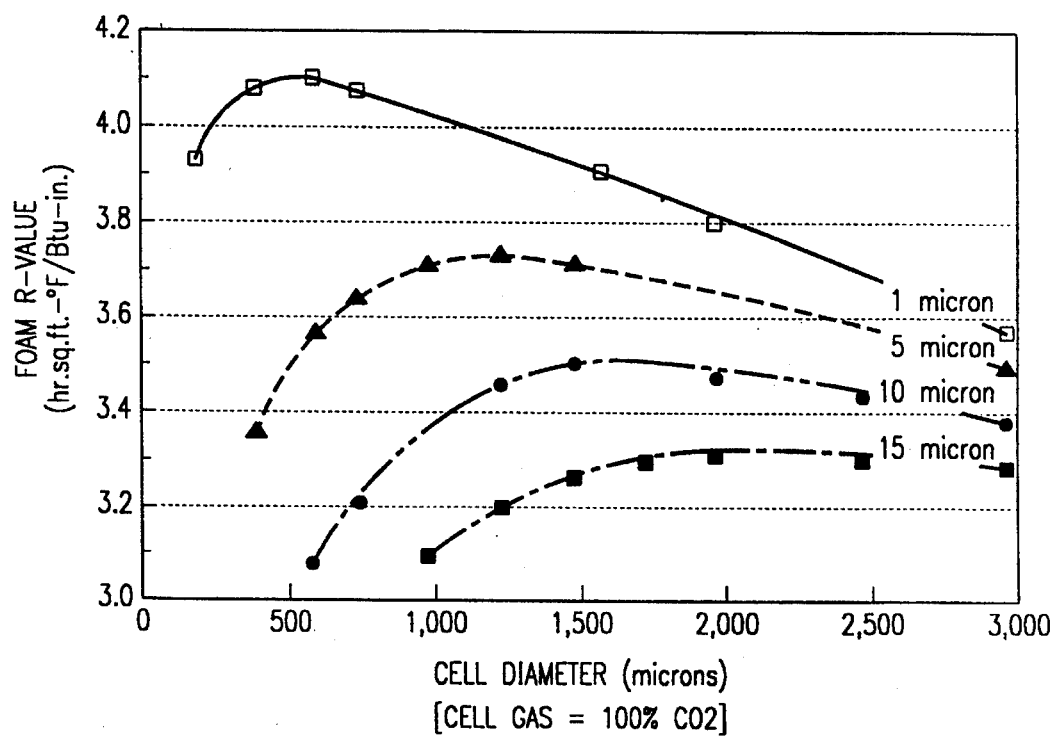
FIG. 3 is a diagram of theoretical R-values for selected cell sizes and cell wall thicknesses for a foamed glass product in which 100% of the gas pressure in the cells is provided by $CO_2$.
Figure 4:
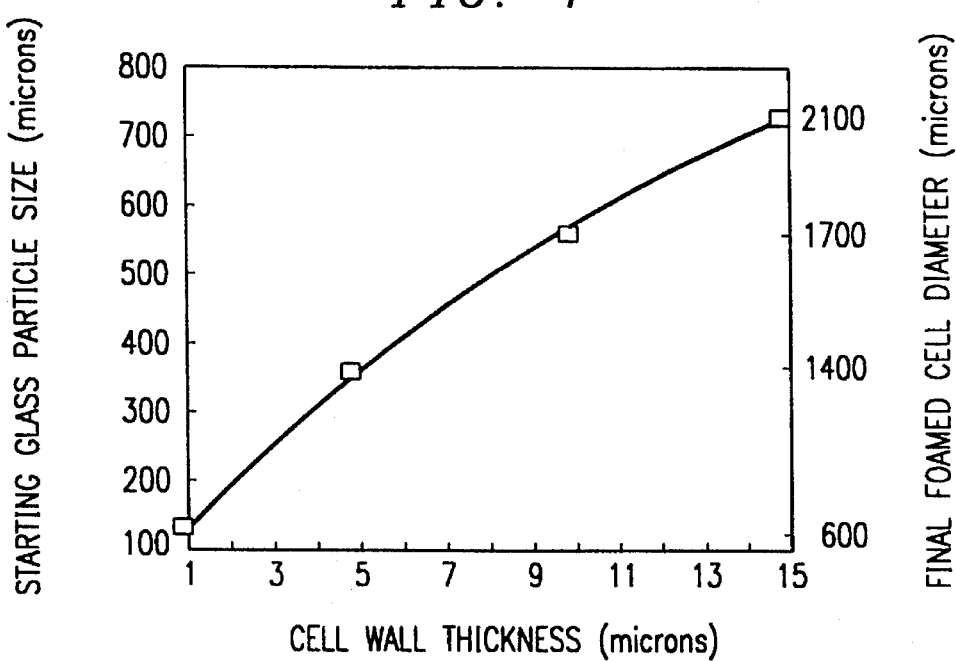
FIG. 4 is a diagram of theoretical cell wall thicknesses for selected starting glass particle sizes (in microns).
Figure 5:
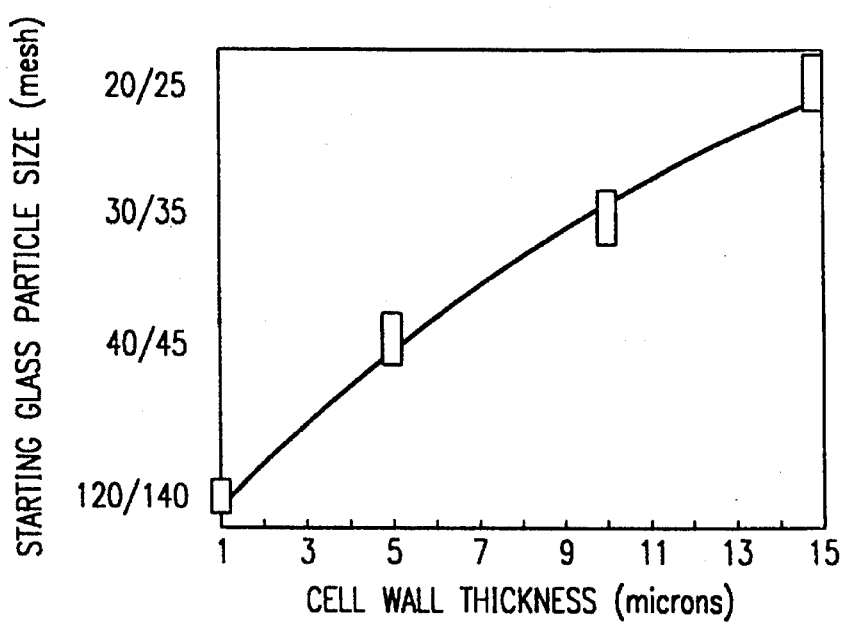
FIG. 5 is a diagram of theoretical cell wall thicknesses for selected starting glass particle sizes (in mesh).

FIGS. 2 and 3 illustrate the relationships between cell wall thicknesses and cell diameters of the foamed glass product, and the R-value of the foamed glass product. Similarly, FIGS. 4 and 5 illustrate the relationship between starting glass particle size and cell diameter and between starting glass particle size and cell wall thickness. The starting glass particle size is selected to obtain the desired cell wall thickness and cell diameter, and therefore, to obtain the desired R-value.

Figure 6:
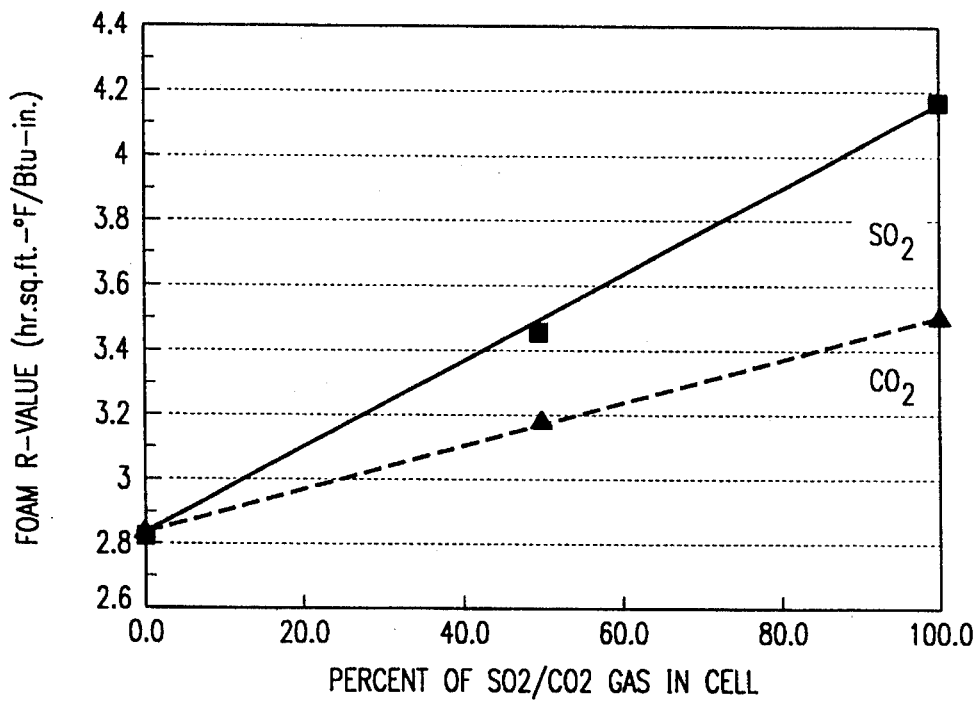
FIG. 6 is a diagram of theoretical R-values for selected cell gas compositions.

In FIG. 2, it is assumed that 100% of the cell gas is $SO_2$, and in FIG. 3, it is assumed that 100% of the cell gas is $CO_2$. It is unlikely that such cell gas composition may be obtained in commercial operation, but this is a simplifying assumption for demonstrating the relationships of the variables discussed above. As generally illustrated in FIG. 6, higher percentages of $SO_2$, or $CO_2$, as compared with air, in the cell gas, yield more favorable R-values.

As shown in FIGS. 2 and 3, there is a strong correlation between average cell wall thickness and resulting R-values. In general, wall thicknesses of approximately 1 to 15 microns is preferred. However, it is unlikely that an average cell wall thickness of below approximately 5 microns can be obtained commercially, so a cell wall thickness of approximately 5 to 15 microns is more preferred, and a cell wall thickness of approximately 5 microns is most preferred.

The desired starting glass particle size and the degree of crushing of the starting particle glass is selected to obtain the desired cell wall thickness and cell diameter and therefore to obtain the desired R-value. As illustrated in FIG. 2, for a foamed glass product having a cell gas with a substantial $SO_2$ component, a cell diameter of approximately 750 to 2,300 microns is preferred, a cell diameter of approximately 1,000 to 1,750 microns is more preferred, and a cell diameter of approximately 1,200 to 1,400 microns is most preferred. Similarly, for a foamed glass product having a cell gas with a substantial $SO_2$ component, a cell diameter of approximately 500 to 3,000 microns is preferred, a cell diameter of approximately 650 to 2,350 microns is more preferred, and a cell diameter of approximately 1,000 to 1,500 is most preferred.

Referring to FIG. 4, to obtain the desired combination of cell wall thickness and cell diameter, a starting glass particle size of approximately 100 to 700 microns is preferred, a starting glass particle size of approximately 350 to 550 microns is more preferred, and a starting glass particle size of approximately 350 microns is most preferred. As shown in FIG. 5, the above values correspond roughly with 120/140 mesh to 20/25 mesh, 40/45 mesh to 30/35 mesh, and 40/45 mesh, respectively.

With respect to the foaming agent, calcium sulfate or calcium carbonate are used depending on the R-value desired. In general, as illustrated in FIGS. 2 and 3, better R-values may be obtained using $CaSO_4$, but $CaCO_3$ is easier to work with. Gypsum is a readily available source of $CaSO_4$, and limestone is a readily available source of $CaCO_3$. It is understood that other sulfates ($SO_x$) or carbonates ($CO_x$) are contemplated.

Figure 7:
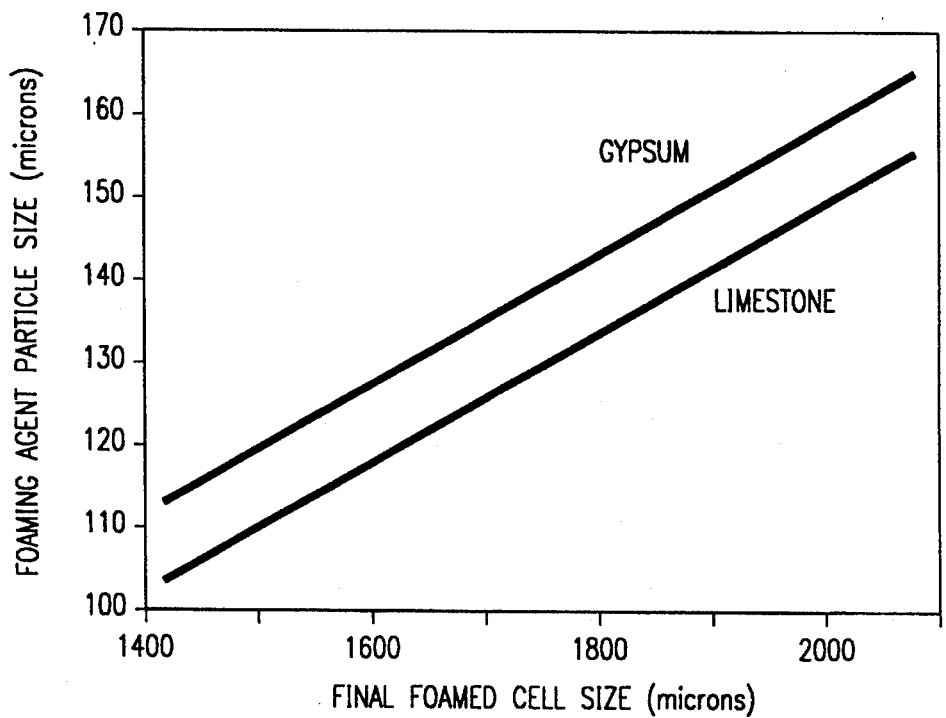
FIG. 7 is a diagram of theoretical average cell diameters for selected starting foaming agent particle sizes.

Similar to the starting glass particle size, the starting foaming agent particle size may impact the R-value of the resulting foamed glass product. The foaming agent is therefore obtained at a desired size or is crushed in a grinding, milling operation and screened to a desired size. If done internally, a hammer mill or any number of known crushing, grinding or milling equipment may be used, although a wet mill process is preferred. As mentioned above, the cell diameter of the foamed glass product affects the R-value of the foamed glass product. As illustrated in FIG. 7, the starting foaming agent particle size affects the cell diameter of the foamed glass product. Accordingly, the starting foaming agent particle size is selected to obtain the desired cell diameter, and therefore to obtain the desired R-value. As with the screening/classification operation for the glass particles, in the screening/classification operation for the foaming agent, the oversized foaming agent particles are returned to the milling operation, and the undersized foaming agent particles are used to make a lower R-value foamed glass product or are sent to waste disposal.

When gypsum is the foaming agent, a starting foaming agent particle size of approximately 110 to 160 microns is preferred, a starting foaming agent particle size of approximately 110 to 120 microns is more preferred, and a starting foaming agent particle size of approximately 110 microns is most preferred. When limestone is the foaming agent, a starting foaming agent particle size of approximately 105 to 155 microns is preferred, a starting foaming agent particle size of approximately 105 to 115 microns is more preferred, and a starting foaming agent particle size of approximately 105 microns is most preferred. The above ranges, in microns, roughly correspond with a size of approximately 80/85 to 140/145 mesh.

Once the desired starting glass particle size and starting foaming agent particle size are obtained, the sized particles are weighed and mixed. Weigh scales are used for weighing the particles, and a rotary type mixer, resembling a cement type mixer, is used to mix the sized particles.

Figure 8:
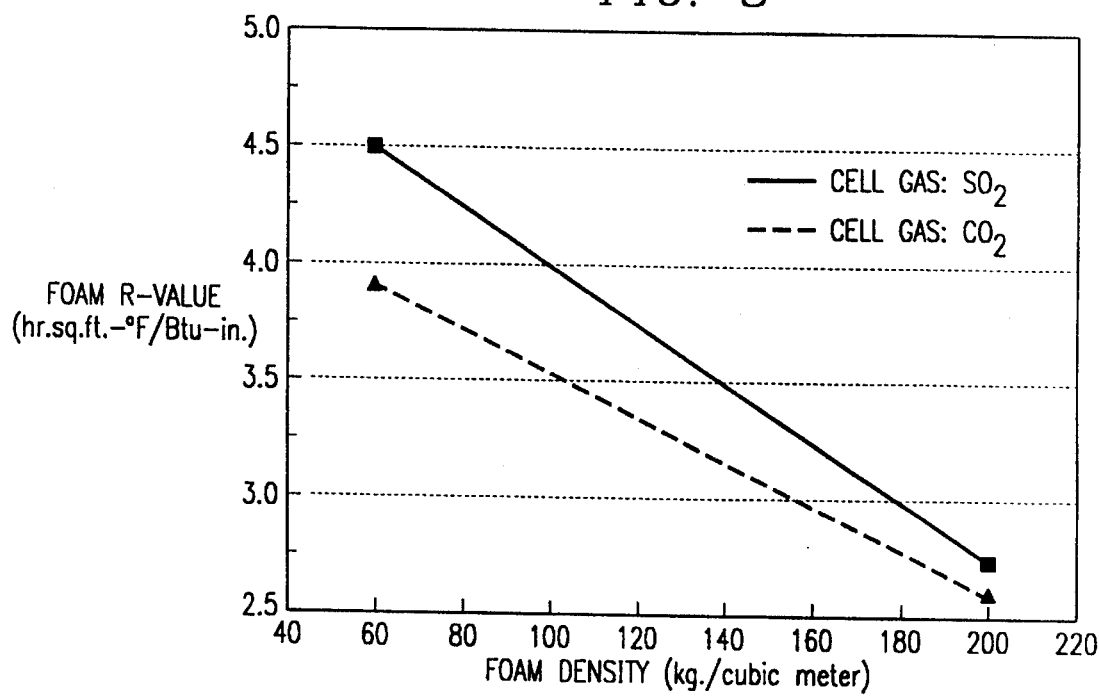
FIG. 8 is a diagram of theoretical R-values for selected foamed glass densities.

As illustrated in FIG. 8, there is a strong correlation between the R-value of the foamed glass product and its density. The weight percent of the foaming agent in the mixture impacts the density of the foamed glass product that is obtained, so the weight percent of the foaming agent is selected to obtain a desired density. A foamed glass product having a density of approximately 60 to 100 $kg/m^3$ is preferred. It is questionable whether densities below 80 $kg/m^3$ may be obtained in commercial operation, so a density of approximately 80 to 100 $kg/m^3$ is more preferred, and a density of approximately 80 $kg/m^3$ is most preferred.

When gypsum is the foaming agent, the $CaSO_4$ component of the foaming agent is preferably present in the mixture in a weight percent of approximately 1.5; more particularly, the $CaSO_4$ is present in the mixture in a weight percent of approximately 1.46 to 1.49; and more particularly still, the $CaSO_4$ is present in the mixture in a weight percent of approximately 1.47. When limestone is the foaming agent, the $CaCO_3$ component of the foaming agent is preferably present in the mixture in a weight percent of approximately 1; more particularly, the $CaCO_3$ is present in the mixture in a weight percent of approximately 1.07 to 1.09; and more particularly still, the $CaCO_3$ is present in the mixture in a weight percent of approximately 1.08. The amount of gypsum or limestone to be used may be calculated based upon the weight percent of $CaSO_4$ in the gypsum used or the weight percent of $CaCO_3$ in the limestone used.

After thorough mixing, the mixture is loaded into a rectangular mold that is somewhat larger, typically 1 to 2 inches, than the desired length and width of the finished product. It is understood that molds of other shapes may be used and that continuous rather than batch processing may be used. Some nominal pressure, such as 1.1 atmospheres, may be applied to the mixture to compress it and to better control the degree of foaming.

After the mixture is loaded into a mold, the mold is placed on a moving belt which moves the mold and mixture through a furnace or oven having a predetermined temperature profile. The foaming temperature is expected to be between approximately 800° and 1100° C., and the furnace temperature profile is such as to rapidly heat the mixture to the foaming temperature, to then provide a region for maintaining a constant, foaming temperature, and to then provide a cooling or annealing region to reduce stress or strain of the foamed glass product and to produce a substantially stress-free or annealed foamed glass block.

As illustrated in FIG. 6, more favorable R-values may be obtained by replacing air in the cells of the foamed glass with nonreactive gases having more desirable insulative properties, preferably $SO_2$ or $CO_2$. Accordingly, a nonreactive, sweeping gas, preferably $SO_2$ or $CO_2$, is blown over the mixture to drive away air during heating and therefore increase the percentage of the nonreactive gas in the cells of the foamed glass.

The sweeping gas is introduced into the furnace so that it is present during the filling, heating and annealing process. Preferably, the sweeping gas is introduced during the foaming process while the glass is being heated in the furnace. The sweeping gas may be continuously added, or preferably, if the furnace is adequately sealed, the sweeping gas may be added only as needed to maintain the concentration of ambient air at about less than one percent.

Design preferences of the particular furnace will determine the extent to which the furnace heating and annealing section is sealed or aspirated to prevent escape of the $SO_2$ or $CO_2$. The design criteria will dictate whether the sweeping gas is introduced only during the heating or foaming stages, or whether its introduction is done during the press/fill stages, and continued during annealing. The flow rate or direction of the sweeping gas can be controlled to avoid disturbing the distribution of the mixture in molds, if necessary.

Equipment for injecting the sweeping gas into the furnace and for purging the ambient air from the furnace includes pipes or tubes extending into the furnace. The pipes are connected to the source of sweeping gas and are regulated by valves or the like to control the amount of gas to be injected. Purging of ambient air in the furnace may also be accomplished by exhaust apparatus, if necessary. The amount of sweeping gas within the furnace is monitored by well known measurement devices. The foregoing equipment, in conjunction with the disclosure herein, is well understood by those skilled in the art and therefore need not be further described.

After heating and annealing, the foamed glass block is removed from the mold and finished such as by cutting and grinding. In finishing, the foamed glass blocks are machined to their desired final dimensions. Ganged band saws may be used to cut the foamed glass blocks to the desired lengths and widths, and a surface grinder may be used to obtain the desired thickness. Depending upon criticality, a surface grinding operation may be performed on all sides. The final, sized foamed glass products may then be packed and shipped.

The above methods allow production of foamed glass products having superior insulative qualities, or higher R-values. For example, when $CaSO_4$ is used, R-values of greater than approximately 3.7 $hr \cdot ft^2 \cdot °F/Btu$ in may be obtained. Further, in commercial production R-values may be obtained in the range of approximately 3.7 to 4.2. Also, when $CaCO_3$ is used, R-values of greater than approximately 3.3 $hr \cdot ft^2 \cdot °F/Btu \cdot in$ may be obtained. Also, in commercial production, R-values may be obtained in the range of approximately 3.3 to 3.6.

Other modifications, changes and substitutions are intended in the foregoing disclosure and although the invention has been described with reference to a specific embodiment, the foregoing description is not intended to be construed in a limiting sense. Various modifications to the disclosed embodiment as well as alternative applications of the invention will be suggested to persons skilled in the art by the foregoing specification and illustrations. Accordingly, it is appropriate that the appended claims be construed broadly and in a manner consistent with the true scope of the invention therein.

What is claimed is:

1. A method of making foamed glass having a selected R-value consisting essentially of:

(a) mixing glass particles and a foaming agent; said foaming agent being selected from the group consisting of $CaSO_4$ and $CaCO_3$ to produce a mixture;

(b) introducing a nonreactive gas to sweep air away from said mixture;

(c) heating said mixture to a foaming temperature from about 800° to about 1100° C. to produce said foamed glass; and (d) maintaining a nonreactive gas atmosphere of said nonreactive gas over said mixture during said heating to sweep air away from said mixture.

2. The method of claim 1 wherein said nonreactive gas is selected from the group consisting of $SO_2$ and $CO_2$.

3. The method of claim 2 wherein said foaming agent is $CaCO_3$ and wherein said nonreactive gas is $CO_2$.

4. The method of claim 3 wherein said $CaCO_3$ is present in an amount equal to about 1.0 weight percent.

5. The method of claim 2 wherein said method further comprises:

loading said mixture into a mold prior to said heating; and heating said mixture to said foaming temperature, and, cooling said mixture after said heating for annealing.

6. The method of claim 5 wherein:

said foaming agent is $CaCO_3$; and said $CaCO_3$ is present in said mixture in a weight percent of approximately 1.

7. The method of claim 5 wherein:

said foaming agent is $CaSO_4$; and said $CaSO_4$ is present in said mixture in a weight percent of approximately 1.5.

8. The method of claim 1 wherein said glass comprise:

contaminated waste glass and said method includes separating contaminants from said contaminated waste glass prior to mixing said glass particles and said $CaSO_4$ or $CaCO_3$.

9. The method of claim 1 wherein said foaming agent is $CaSO_4$ and wherein said nonreactive gas is $SO_2$.

10. The method of claim 9 wherein said $CaSO_4$ is present in an amount equal to approximately 1.5 weight percent of the mixture.

11. The method of claim 1 wherein said glass particles have an average particle size from about 100 to about 700 microns.

12. The method of claim 11 wherein said foaming agent is $CaCO_3$ particles having an average particle size from about 105 to about 155 microns.

13. The method of claim 11 wherein said foaming agent is $CaSO_4$ particles having an average particle size from about 110 to about 160 microns.

14. The method of claim 11 wherein said glass particles have an average particle size from about 350 to about 550 microns.

\* \* \* \* \*